(12) United States Patent
Chi et al.

(10) Patent No.: US 12,531,602 B2
(45) Date of Patent: Jan. 20, 2026

(54) METHOD AND APPARATUS FOR PRECODING RECONFIGURABLE INTELLIGENT SURFACE(RIS)

(71) Applicant: Beijing Xiaomi Mobile Software Co., Ltd., Beijing (CN)

(72) Inventors: Liangang Chi, Beijing (CN); Li Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 53 days.

(21) Appl. No.: 18/707,011

(22) PCT Filed: Nov. 3, 2021

(86) PCT No.: PCT/CN2021/128457
§ 371 (c)(1),
(2) Date: May 2, 2024

(87) PCT Pub. No.: WO2023/077311
PCT Pub. Date: May 11, 2023

(65) Prior Publication Data
US 2025/0007569 A1    Jan. 2, 2025

(51) Int. Cl.
*H04B 7/04*      (2017.01)
*H04B 7/0456*    (2017.01)

(52) U.S. Cl.
CPC ....... *H04B 7/04026* (2023.05); *H04B 7/0456* (2013.01)

(58) Field of Classification Search
CPC .............. H04B 7/04026; H04B 7/04013
See application file for complete search history.

(56) References Cited

U.S. PATENT DOCUMENTS

| 2022/0271805 A1* | 8/2022 | Gao | ...... H04L 5/0048 |
| 2024/0236705 A1* | 7/2024 | Henry | ...... H04W 16/28 |

FOREIGN PATENT DOCUMENTS

| CN | 111050276 A | 4/2020 |
| CN | 111245492 A | 6/2020 |
| CN | 112153653 A | 12/2020 |
| WO | 2020/254031 A1 | 12/2020 |
| WO | 2021/092746 A1 | 5/2021 |

OTHER PUBLICATIONS

ISA State Intellectual Property Office of the People's Republic of China, International Search Report Issued in Application No. PCT/CN2021/128457, May 26, 2022, WIPO, 4 pages.

(Continued)

*Primary Examiner* — Sung S Ahn
(74) *Attorney, Agent, or Firm* — Volpe Koenig

(57) ABSTRACT

A method and apparatus for precoding a reconfigurable intelligent surface (RIS) are disclosed, the method is performed by a terminal device, including: determining a precoding matrix indicator (PMI) and an additional deflection phase angle for each RIS unit group in an RIS array according to channel information of the each RIS unit group; and sending first indication information, where the first indication information indicates the precoding matrix indicator and the additional deflection phase angle for the each RIS unit group.

20 Claims, 5 Drawing Sheets

Receive second indication information, where the second indication information indicates RIS unit groups included in an RIS array — 31

Determine a precoding matrix indicator (PMI) and an additional deflection phase angle for each RIS unit group in the RIS array according to channel information of the each RIS unit group — 32

Send first indication information, where the first indication information indicates the precoding matrix indicator and the additional deflection phase angle for the each RIS unit group — 33

(56) References Cited

OTHER PUBLICATIONS

Wang, Junwei. "Channel Estimation and Precoder Design for mmWave MIMO Systems". Chinese Master's Theses Full-text Database No. 2, Feb. 28, 2021, 74 pages.
European Patent Office, Extended European Search Report Issued in Application No. 219628294, Nov. 19, 2024, Germany, 8 pages.
Pan Yan et al: "Channel Estimation For Wireless Communication Systems Aided By Large Intelligent Reflecting Surface", XP033893899, 2021 IEEE 2nd International Conference on Big Data, Artificial Intelligence and Internet of Things Engineering (ICBAIE), Mar. 26, 2021, 7 pages.
ISA State Intellectual Property Office of the People's Republic of China, Written Opinion of the International Searching Authority Issued in Application No. PCT/CN2021/128457, May 26, 2022, WIPO, 8 pages.

\* cited by examiner

METHOD AND APPARATUS FOR PRECODING RECONFIGURABLE INTELLIGENT SURFACE(RIS)

CROSS-REFERENCE TO RELATED APPLICATION

The present application is a U.S. National Stage of International Application No. PCT/CN2021/128457, filed on Nov. 3, 2021, the contents of which are incorporated herein by reference in their entirety.

TECHNICAL FIELD

The present disclosure relates to the field of communication technologies, and in particular, to methods and apparatuses for precoding a reconfigurable intelligent surface (RIS).

BACKGROUND

A reconfigurable intelligence surface (RIS) can reflect a signal incident on its surface to a specific direction through precoding technology, thus enhancing the signal strength at a receiving end and realizing a control of a channel. In related precoding technologies, different algorithms can be used to jointly design a precoding matrix of RIS array and a precoding matrix of a network device side respectively. However, when a size of the RIS array is comparable to a propagation distance, a precoding scheme based on a far-field hypothesis will not be established. Therefore, how to precode RIS to make the far-field hypothesis hold has become an important research direction.

SUMMARY

Embodiments of the present disclosure provide methods and apparatuses for precoding a reconfigurable intelligent surface (RIS), which can be applied to the field of communication technologies.

In a first aspect, an embodiment of the present disclosure provides a method of precoding a reconfigurable intelligent surface (RIS), performed by a terminal device, including: determining a precoding matrix indicator (PMI) and an additional deflection phase angle for each RIS unit group in an RIS array according to channel information of the each RIS unit group; and sending first indication information, where the first indication information indicates the precoding matrix indicator and the additional deflection phase angle for the each RIS unit group.

In a second aspect, an embodiment of the present disclosure provides a method of precoding a reconfigurable intelligent surface (RIS), performed by a network device, including: receiving first indication information, where the first indication information indicates a precoding matrix indicator (PMI) and an additional deflection phase angle for each RIS unit group in an RIS array. Where the PMI and the additional deflection phase angle for the each RIS unit group are determined by a terminal device according to channel information of the each RIS unit group in the RIS array.

In a third aspect, an embodiment of the present disclosure provides a method of precoding a reconfigurable intelligent surface (RIS), performed by an RIS array, including: receiving first indication information, where the first indication information indicates a precoding matrix indicator (PMI) and an additional deflection phase angle for each RIS unit group in the RIS array. Where the PMI and the additional deflection phase angle for the each RIS unit group are determined by a terminal device according to channel information of the each RIS unit group in the RIS array.

BRIEF DESCRIPTION OF DRAWINGS

In order to more clearly illustrate the technical solutions in the embodiments or background art of the present disclosure, the accompanying drawings to be used in the embodiments or background art of the present disclosure will be described below.

DETAILED DESCRIPTION

Reference will now be made in detail to exemplary embodiments, examples of which are illustrated in the accompanying drawings. When the following description refers to the accompanying drawings, unless otherwise indicated, the same numbers in different accompanying drawings indicate the same or similar elements. Embodiments described in the following exemplary embodiments do not represent all embodiments consistent with the present disclosure. Rather, they are merely examples of apparatuses and methods consistent with some aspects of the present disclosure as detailed in the appended claims.

It can be understood that "plurality" in the present disclosure means two or more, and that other quantifiers are similar. "And/or" describes the relationship of related objects, means that there can be three kinds of relationships, for example, A and/or B, which can mean that A exists alone, A and B exist together, and B exists alone. The character "/" generally indicates that the associated object is an "or" relationship. Singular forms of "a", "said", and "the" are also intended to include majority forms, unless the context clearly indicates otherwise.

In order to facilitate understanding, the terms involved in the present disclosure are first introduced.

1. Reconfigurable intelligence surface (RIS). Reconfigurable intelligent surface (RIS) can also be called "reconfigurable intelligence surface" or "smart reflective surface". From the outside, the RIS is an ordinary thin sheet. However, it can be flexibly deployed in a wireless communication propagation environment, and realize manipulation of frequency, phase, polarization and other characteristics of reflected or refracted electromagnetic waves, thus achieving a purpose of reshaping a wireless channel. Specifically, RIS can reflect a signal incident on its surface to a specific direction through precoding technology, thus enhancing the signal strength at a receiving end and realizing a control of a channel.

2. Precoding Matrix Indicator (PMI). PMI refers to that only in a transmission mode of closed-loop spatial multiplexing, a terminal device tells a network device what type of precoding matrix to use to precoding a physical downlink shared Channel (PDSCH) of the terminal device. Each PMI corresponds to a horizontal-dimensional beamforming vector and a vertical-dimensional beamforming vector, and a precoding matrix can be obtained by multiplying the horizontal-dimensional beamforming vector and the vertical-dimensional beamforming vector. In this precoding matrix, each element is a continuous deflection phase angle for one RIS unit in the RIS array.

In order to better understand a method of precoding a reconfigurable intelligent surface (RIS) disclosed in embodiments of the present disclosure, a communication system applicable to the embodiments of the present disclosure will be described below.

Figure 1:
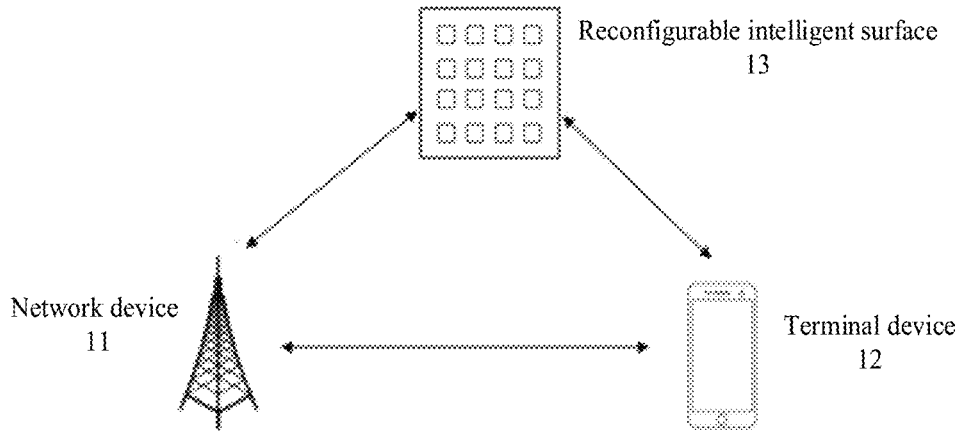
FIG. 1 is a schematic architectural diagram of a communication system according to an embodiment of the present disclosure.

Referring to FIG. 1, FIG. 1 is a schematic architectural diagram of a communication system according to an embodiment of the present disclosure. The communication system may include, but is not limited to, a terminal device, a network device and an RIS. The number and form of devices shown in FIG. 1 are only for example and do not constitute a limitation to the embodiments of the present disclosure. In practical application, it may include two or more terminal devices, two or more network devices and two or more RIS devices. The communication system shown in FIG. 1 is exemplified by including a network device 11, a terminal device 12, and a reconfigurable intelligent surface 13.

It should be noted that the technical solutions of the embodiments of the present disclosure can be applied to various communication systems. For example: a long term evolution (LTE) system, a $5^{th}$ generation (5G) mobile communication system, a 5G new radio (NR) system, or other future new mobile communication systems. The network device 11 in the embodiment of the present disclosure is an entity on a network side for transmitting or receiving signals. For example, the network device 11 may be an evolved NodeB (eNB), a next generation NodeB (gNB) in an NR system, a base station in other future mobile communication systems or an access node in a wireless fidelity (WiFi) system. The embodiments of the present disclosure do not limit specific technologies and specific device forms adopted by the network device.

The network device 11 provided by the embodiment of the present disclosure may be composed of a central unit (CU) and a distributed unit (DU), where CU may also be called a control unit. With a structure of CU-DU, protocol layers of a network device, such as a base station, can be separated, and some functions of the protocol layers are centralized controlled by CU, while some or all functions of the remaining protocol layers are distributed in DU, which is centralized controlled by CU. Both the CU and DU may have any known structure of a processor/processing unit.

The terminal device 12 in the embodiment of the present disclosure is an entity, such as a mobile phone, on a user side for receiving or transmitting signals. The terminal device can also be called a terminal, a user equipment (UE), a mobile station (MS), a mobile terminal (MT) and so on. The terminal device can be a car with communication function, a smart car, a mobile phone, a wearable device, a Pad, a computer with wireless transceiver function, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, a wireless terminal device in smart home, etc. The embodiments of the present disclosure do not limit specific technologies and specific device forms adopted by the terminal device.

The reconfigurable intelligent surface 13 in the embodiment of the present disclosure can be a plane composed of a large number of low-cost passive reflective elements, which can be placed between a network device and a terminal device. The reconfigurable intelligent surface can be a low-cost adaptive thin composite board, similar to wallpaper, covering walls, buildings, cellular and other parts. The embodiments of the present disclosure do not limit specific technologies and specific device forms adopted by the terminal device.

It can be understood that the communication system described in the embodiments of the present disclosure is intended to more clearly illustrate the technical solutions of the embodiments of the present disclosure and does not constitute a limitation of the technical solutions provided by the embodiments of the present disclosure, and a person of ordinary skill in the art may know that, with an evolution of a system architecture and an emergence of a new business scenario, the technical solutions provided by the embodiments of the present disclosure are equally applicable to similar technical problems.

Precoding of a reconfigurable intelligent surface RIS and an apparatus thereof provided by the present disclosure are described in detail below in conjunction with the accompanying drawings.

Figure 2:
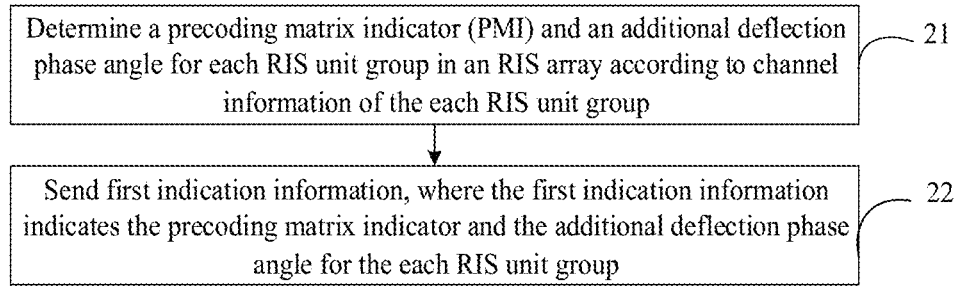
FIG. 2 is a schematic flowchart of precoding of a reconfigurable intelligent surface (RIS) according to an embodiment of the present disclosure.

Referring to FIG. 2, FIG. 2 is a schematic flowchart of precoding of a reconfigurable intelligent surface (RIS) according to an embodiment of the present disclosure. The method is configured to be performed by a terminal device. As shown in FIG. 2, the method may include, but is not limited to, steps 21 and 22.

At step 21: a precoding matrix indicator (PMI) and an additional deflection phase angle for each RIS unit group in an RIS array are determined according to channel information of the each RIS unit group.

The RIS array can perform different phase shifts on a received signal, thus adjusting a reflected beam direction. In order to reflect the received signal to a corresponding receiving end, a deflection phase angle of the RIS array needs to be configured, e.g., the RIS array is precoded. In related technologies, different algorithms are used to jointly design precoding matrices of RIS array and network device side respectively. Since scale of the RIS array and propagation distance are comparable, a precoding scheme based on a far-field assumption will not be valid. In the present disclosure, the RIS array may first be grouped so that there is no comparability between a size of each RIS unit group and the propagation distance, so that an electromagnetic wave can be treated as a plane wave, i.e., to ensure that each RIS unit group conforms to the precoding scheme assumed in the far-field, and then after that, uniform precoding is performed on each RIS unit group and the network device side. Therefore, the flexibility and reliability of RIS array are improved.

The channel information of the each RIS unit group can be channel state information, such as signal scattering, environmental fading (fading, multipath fading or shadowing fading), power decay of distance and other information.

After determining the channel information of the each RIS unit group, the terminal device can perform a joint design to determine the PMI and additional deflection phase angle for the each RIS unit group. PMIs for different groups of RIS units can be the same or different, and the additional deflection phase angles for different groups of RIS units can be the same or different. The present disclosure is not limited thereto.

At step 22, first indication information is sent, where the first indication information indicates the precoding matrix indicator and the additional deflection phase angle for the each RIS unit group.

In some examples, the terminal device may send the first indication information to the RIS array; or, the terminal device may also send the first indication information to a network device.

The terminal device sends the first indication information to the RIS array or network device to indicate the precoding matrix indicator and additional deflection phase angle for the each RIS unit group, so that the RIS array or network device precodes each RIS unit group according to the PMI and the additional deflection phase angle for each RIS unit group.

By implementing the embodiment of the present disclosure, the terminal device first determines the PMI and additional deflection phase angle for each RIS unit group based on the channel information of the each RIS unit group in the RIS array, and then indicates the precoding matrix indicator and the additional deflection phase angle for the each RIS unit group to the network device or the RIS array, so that the network device or the RIS array can precode each RIS unit group. As a result, not only the problem that the precoding scheme fails because the RIS array does not meet the far-field hypothesis is avoided, but also the complexity of RIS precoding is reduced.

Figure 3:
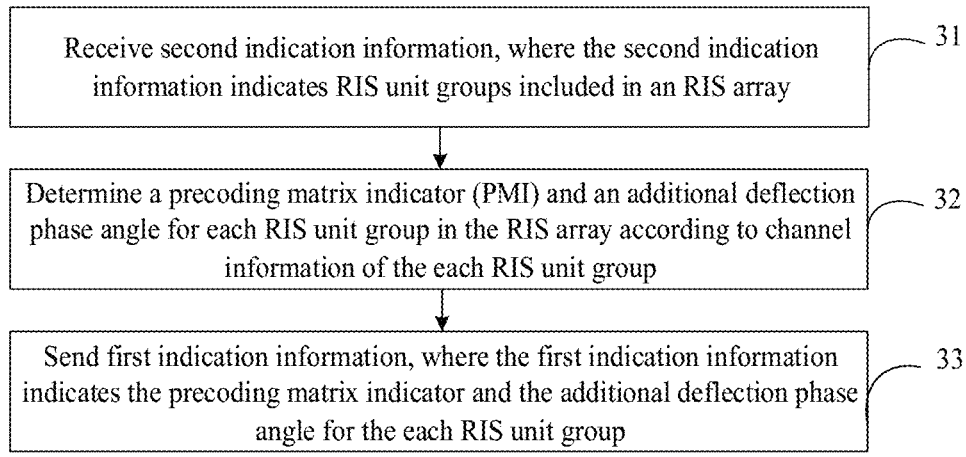
FIG. 3 is a schematic flowchart of precoding of a reconfigurable intelligent surface (RIS) according to an embodiment of the present disclosure.

Referring to FIG. 3, FIG. 3 is another schematic flowchart of method of precoding a reconfigurable intelligent surface (RIS) according to an embodiment of the present disclosure. The method is configured to be performed by a terminal device. As shown in FIG. 3, the method may include, but is not limited to, steps 31-33.

At step 31, second indication information is received, where the second indication information indicates RIS unit groups included in an RIS array.

In some examples, the terminal device can determine RIS unit groups included in the RIS array by receiving the second indication information sent by the network device. That is, a grouping method of RIS unit groups included in the RIS array is configured by the network device.

At step 32: a precoding matrix indicator (PMI) and an additional deflection phase angle for each RIS unit group in the RIS array are determined according to channel information of the each RIS unit group.

At step 33, first indication information is sent, where the first indication information indicates the precoding matrix indicator and the additional deflection phase angle for the each RIS unit group.

The specific implementation forms of step 32 and step 33 can refer to the detailed steps in other embodiments of the present disclosure, and will not be described in detail here.

By implementing the embodiment of the present disclosure, the terminal device first receives the second indication information sent by the network device for indicating the RIS unit groups included in the RIS array, then determines the precoding matrix indicator (PMI) and additional deflection phase angle for each RIS unit group based on the channel information of the each RIS unit group in the RIS array, and finally indicates the precoding matrix indicator and the additional deflection phase angle for the each RIS unit group to the network device or the RIS array, so that the network device or the RIS array can precode each RIS unit group. As a result, not only the problem that the precoding scheme fails because the RIS array does not meet the far-field hypothesis is prevented, but also the complexity of RIS precoding is reduced.

Figure 4:
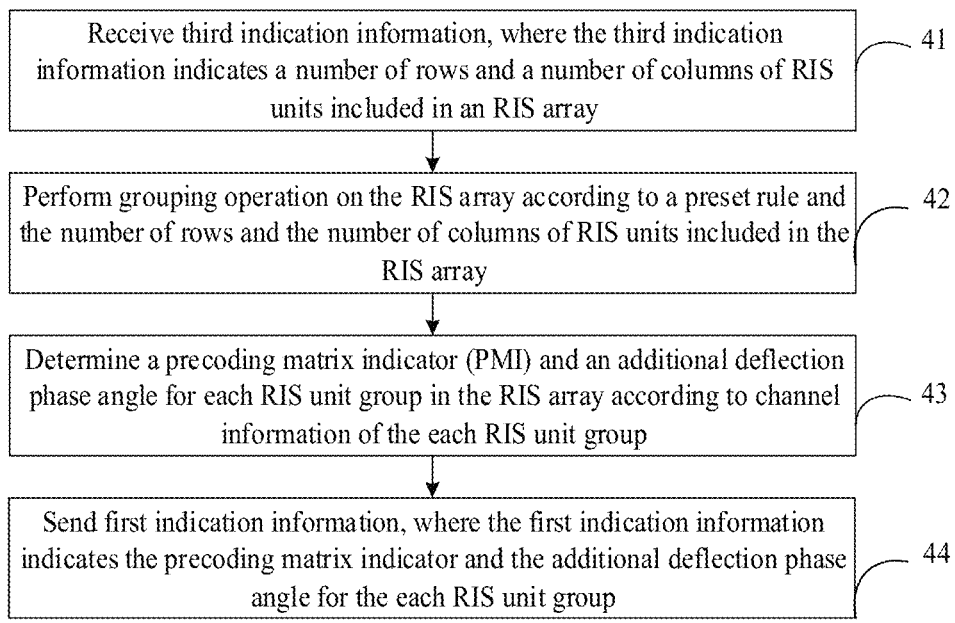
FIG. 4 is a schematic flowchart of precoding of a reconfigurable intelligent surface (RIS) according to an embodiment of the present disclosure.

Referring to FIG. 4, FIG. 4 is another schematic flowchart of method of precoding a reconfigurable intelligent surface (RIS) according to an embodiment of the present disclosure. The method is configured to be performed by a terminal device. As shown in FIG. 4, the method may include, but is not limited to, steps 41-44.

At step 41, third indication information is received, where the third indication information indicates a number of rows and a number of columns of RIS units included in an RIS array.

In some examples, the terminal device may receive the third indication information sent by the network device, where the third indication information indicates the number of rows and the number of columns of RIS units included in the RIS array.

After receiving the third indication information sent by the network device, the terminal device can perform grouping operation on the RIS array according to the number of rows and the number of columns of RIS units included in the RIS array.

At step 42, grouping operation is performed on the RIS array according to a preset rule and the number of rows and the number of columns of RIS units included in the RIS array.

In some examples, the preset rule can be any of the following: grouping RIS units in every continuous M rows and continuous N columns into one group; grouping RIS units in every continuous L rows and spaced S columns into one group; grouping RIS units in every spaced P rows and continuous Q columns into one group; or grouping RIS units in every spaced F rows and spaced R columns into one group. Where M, N, L, S, P, Q, F, and R are positive integers, respectively.

At step 43: a precoding matrix indicator (PMI) and an additional deflection phase angle for each RIS unit group in the RIS array are determined according to channel information of the each RIS unit group.

At step 44, first indication information is sent, where the first indication information indicates the precoding matrix indicator and the additional deflection phase angle for the each RIS unit group.

The specific implementation forms of step 43 and step 44 can refer to the detailed steps in other embodiments of the present disclosure, and will not be described in detail here.

By implementing the embodiment of the present disclosure, the terminal device first receives the third indication information indicating the number of rows and the number of columns of RIS units included in the RIS array, groups the RIS array according to the preset rule and the number of rows and the number of columns of RIS units included in the RIS array, then determines the precoding matrix indicator (PMI) and additional deflection phase angle for each RIS unit group based on the channel information of the each RIS unit group in the RIS array, and finally indicates the precoding matrix indicator and the additional deflection phase angle for the each RIS unit group to the network device or the RIS array, so that the network device or the RIS array can precode each RIS unit group. As a result, not only the problem that the precoding scheme fails because the RIS array does not meet the far-field hypothesis is avoided, but also the complexity of RIS precoding is reduced.

Figure 5:
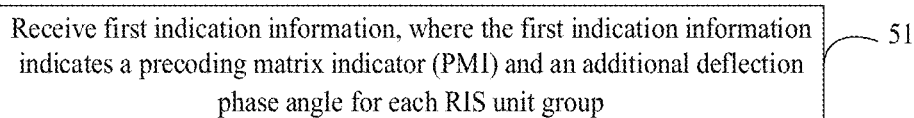
FIG. 5 is a schematic flowchart of precoding of a reconfigurable intelligent surface (RIS) according to an embodiment of the present disclosure.

Referring to FIG. 5, FIG. 5 is another schematic flowchart of precoding of a reconfigurable intelligent surface (RIS) according to an embodiment of the present disclosure. The method is configured to be performed by a network device. As shown in FIG. 5, the method may include, but is not limited to, step 51.

At step 51, first indication information is received, where the first indication information indicates a precoding matrix indicator (PMI) and an additional deflection phase angle for each RIS unit group; where the PMI and the additional deflection phase angle for the each RIS unit group are determined by a terminal device according to channel information of the each RIS unit group in an RIS array.

The first indication information may be sent by the terminal device. For example, after the terminal device determines information of the PMI and the additional deflection phase angle for each RIS unit group, the terminal device can send the PMI and additional deflection angle for the each RIS unit group to the network device through the first indication information.

After receiving the PMI and the additional deflection angle for each RIS unit group sent by the terminal device, the network device can precode each RIS unit group according to the PMI and the additional deflection angle for the each RIS unit group.

By implementing the embodiment of the present disclosure, the first indication information received by the network device indicates the PMI and the additional deflection phase angle for each RIS unit group, and then the network device can precode each RIS unit group. As a result, not only the problem that the precoding scheme fails because the RIS array does not meet the far-field hypothesis is avoided, but also the complexity of RIS precoding is reduced.

Figure 6:
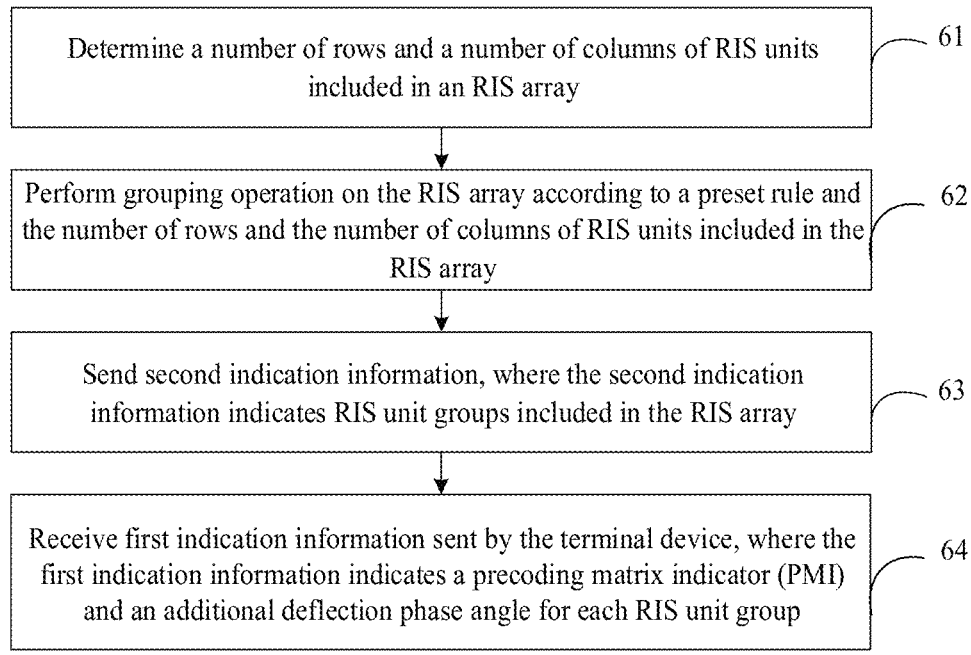
FIG. 6 is a schematic flowchart of precoding of a reconfigurable intelligent surface (RIS) according to an embodiment of the present disclosure.

Referring to FIG. 6, FIG. 6 is another schematic flowchart of precoding of a reconfigurable intelligent surface (RIS) according to an embodiment of the present disclosure. The method is configured to be performed by a network device. As shown in FIG. 6, the method may include, but is not limited to, steps 61-64.

At step 61, a number of rows and a number of columns of RIS units included in an RIS array is determined.

In some examples, the RIS array can report the number of rows and the number of columns of RIS units it contains to the network device.

In some examples, after the RIS array reports the number of rows and the number of columns of RIS units it includes to the network device, the network device can perform grouping operation on the RIS array according to the number of rows and the number of columns of RIS units contained in the RIS array.

Additionally or alternatively, the network device may also send third indication information to the network device, where the third indication information indicates the number of rows and the number of columns of RIS units included in the RIS array. After that, the terminal device can perform grouping operation on the RIS array according to the number of rows and the number of columns of RIS units contained in the RIS array indicated by the network device.

At step 62, grouping operation is performed on the RIS array according to a preset rule and the number of rows and the number of columns of RIS units included in the RIS array.

In some examples, the preset rule can be any of the following: grouping RIS units in every continuous M rows and continuous N columns into one group; grouping RIS units in every continuous L rows and spaced S columns into one group; grouping RIS units in every spaced P rows and continuous Q columns into one group; or grouping RIS units in every spaced F rows and spaced R columns into one group. Where M, N, L, S, P, Q, F, and R are positive integers, respectively.

At step 63, second indication information is sent, where the second indication information indicates RIS unit groups included in the RIS array.

After the grouping operation is performed on the RIS array, the network device can send the RIS unit groups included in the RIS array to the terminal device. Thus, the terminal device can determine a precoding matrix indicator (PMI) and an additional deflection phase angle for each RIS unit group according to channel information of each RIS unit group in the RIS array.

At step 64, the first indication information sent by the terminal device is received. The first indication information indicates a precoding matrix indicator (PMI) and an additional deflection phase angle for each RIS unit group, where the precoding matrix indicator (PMI) and the additional deflection phase angle for the each RIS unit group are determined by a terminal device according to channel information of the each RIS unit group in the RIS array.

The specific implementation forms of step 64 can refer to the detailed steps in other embodiments of the present disclosure, and will not be described in detail here.

By implementing the embodiment of the present disclosure, the network device first determines the number of rows and the number of columns of RIS units included in the RIS array, groups the RIS array according to the preset rule and the number of rows and the number of columns of RIS units included in the RIS array, indicates the RIS unit groups included in the RIS array to the terminal device, then receives the first indication information of the precoding matrix indicator (PMI) and the additional deflection phase angle for each RIS unit group indicated by the terminal device, and finally, the network device can precode each RIS unit group. As a result, not only the problem that the precoding scheme fails because the RIS array does not meet the far-field hypothesis is avoided, but also the complexity of RIS precoding is reduced.

Figure 7:
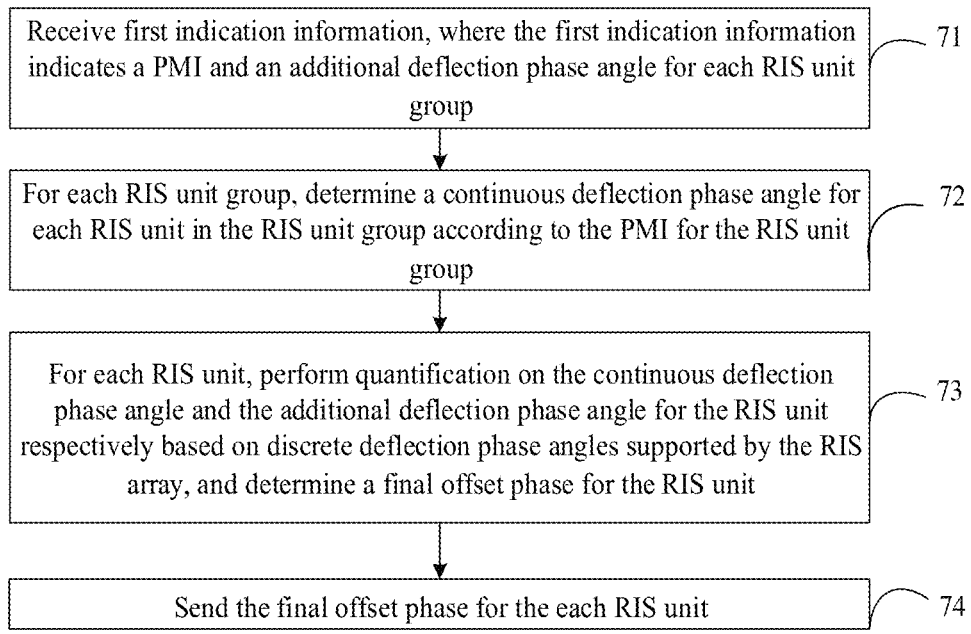
FIG. 7 is a schematic flowchart of precoding of a reconfigurable intelligent surface (RIS) according to an embodiment of the present disclosure.

Referring to FIG. 7, FIG. 7 is another schematic flowchart of precoding of a reconfigurable intelligent surface (RIS) according to an embodiment of the present disclosure. The method is configured to be performed by a network device. As shown in FIG. 7, the method may include, but is not limited to, steps 71-74.

At step 71, first indication information is received, where the first indication information indicates a PMI and an additional deflection phase angle for each RIS unit group; where the precoding matrix indicator (PMI) and the additional deflection phase angle for the each RIS unit group are determined by a terminal device according to channel information of the each RIS unit group in the RIS array.

The specific implementation forms of step 71 can refer to the detailed steps in other embodiments of the present disclosure, and will not be described in detail here.

At step 72, for each RIS unit group, a continuous deflection phase angle for each RIS unit in the RIS unit group is determined according to the PMI for the RIS unit group.

In some examples, for the each RIS unit group, the network device may first determine a horizontal-dimensional beamforming vector and a vertical-dimensional beamforming vector for the RIS unit group based on the PMI for the RIS unit group, and then determine the continuous deflection phase angle for each RIS unit in the RIS unit group according to the horizontal-dimensional beamforming vector and the vertical-dimensional beamforming vector for the RIS unit group.

It can be understood that the PMI for each RIS unit group is associated with one horizontal-dimensional beamforming vector and one vertical-dimensional beamforming vector respectively. Therefore, for the each RIS unit group, after determining the horizontal-dimensional beamforming vector and the vertical-dimensional beamforming vector for the RIS unit group, the horizontal beamforming vector and the vertical beamforming vector for the RIS unit group can be multiplied to obtain a precoding matrix, that is, the continuous deflection phase angle for each RIS unit in the RIS unit group can be determined.

At step 73, for each RIS unit, quantification is performed on the continuous deflection phase angle and the additional deflection phase angle for the RIS unit respectively based on discrete deflection phase angles supported by the RIS array, and a final offset phase for the RIS unit is determined.

In some examples, the RIS array may first report its own supportable discrete deflection phase angles to the network device, or, the network device may, based on protocol conventions or configuration information, determine the discrete deflection phase angles supported by the RIS array, and thereafter, based on the discrete deflection phase angles supportable by the RIS array, quantize the continuous deflection phase angle and additional deflection phase angle for each RIS unit respectively, and determine a final offset phase for each RIS unit.

In some examples, for each RIS unit, the network device may first determine a discrete deflection phase angle with a smallest absolute value of a difference from the continuous deflection phase angle for the RIS unit as a discrete deflection phase angle for the RIS unit. Then, the network device determines a discrete deflection phase angle with a smallest absolute value of a difference from the additional deflection phase angle for the RIS unit as a quantized additional deflection phase angle for the RIS unit. Finally, the network device determines a sum of the discrete deflection phase angle and the quantized additional deflection phase angle for the RIS unit as the final offset phase for the RIS unit.

For example, a continuous deflection phase angle of RIS #1 unit is $\omega$, an additional deflection phase angle of RIS #1 unit is $\omega_d$, and discrete deflection phase angles supported by RIS array are $\omega 1$, $\omega 2$, $\omega 3$ and $\omega 4$. If a discrete deflection phase angle with a smallest absolute value of a difference from the continuous deflection phase angle $\omega$ for RIS #1 unit is $\omega 1$, $\omega 1$ is a discrete deflection phase angle for RIS #1 unit. If a discrete deflection phase angle with a smallest absolute value of a difference from the additional deflection phase angle $\omega_d$ for RIS #1 unit is $\omega 3$, $\omega 3$ is a quantized additional deflection phase angle for RIS #1. Then a final offset phase for RIS #1 unit is $\omega 1 + \omega 3$. This example is only a simple illustration, and should not be used as a specific definition of the continuous deflection phase angle, the additional deflection phase angle, and the final offset phase for each RIS unit in the embodiment of the present disclosure.

At step 74, the final offset phase for the each RIS unit is sent.

In some examples, the network device can send the final offset phase for each RIS unit to the RIS array. Or, the network device can also send the final offset phase for each RIS unit to the terminal device.

After determining the final offset phase for each RIS unit, the network device can send the final offset phase for the each RIS unit to the RIS array, or send the final offset phase for the each RIS unit to the terminal device, and the terminal device will forward the final offset phase to the RIS array, so that each RIS unit group in the RIS array can reflect an incident signal based on a corresponding final offset phase, so that the terminal device can accurately receive the information sent by the network device and improve the quality of communication services.

By implementing the embodiments of the present disclosure, the network device first receives the first indication information indicating the precoding matrix indicator (PMI) and additional deflection phase angle for each RIS unit group, and for the each RIS unit group, determines the continuous deflection phase angle for each RIS unit in the RIS unit group according to the PMI for the RIS unit group, and then, based on the discrete deflection phase angles supported by the RIS array, quantizes the continuous deflection phase angle and additional deflection phase angle for the each RIS unit respectively, determines the final offset phase for the each RIS unit, and finally indicates the final offset phase for the each RIS unit to the RIS array. Thus, by performing grouping operation on the RIS array and determining the final offset phase for each RIS unit in the RIS array according to the PMI and the additional deflection phase angle for each RIS unit group, not only the problem that the precoding scheme fails because the RIS array does not meet the far-field hypothesis is avoided, but also the complexity of RIS precoding is reduced.

Figure 8:
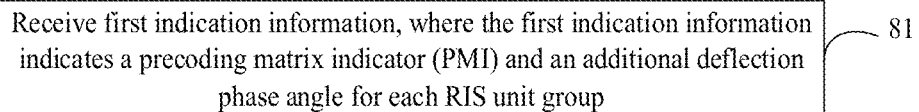
FIG. 8 is a schematic flowchart of precoding of a reconfigurable intelligent surface (RIS) according to an embodiment of the present disclosure.

Referring to FIG. 8, FIG. 8 is another schematic flowchart of precoding of a reconfigurable intelligent surface (RIS) according to an embodiment of the present disclosure. The method is configured to be performed by an RIS array. As shown in FIG. 8, the method may include, but is not limited to, step 81.

At step 81, first indication information is received, where the first indication information indicates a precoding matrix indicator (PMI) and an additional deflection phase angle for each RIS unit group. Where the precoding matrix indicator (PMI) and the additional deflection phase angle for the each RIS unit group are determined by a terminal device according to channel information of the each RIS unit group in the RIS array.

In some examples, the RIS array may receive the first indication information sent by a network device; or, the RIS array may also receive the first indication information sent by a terminal device. That is, after determining the precoding matrix indicator (PMI) and the additional deflection phase angle for each RIS unit group, the terminal device can send the precoding matrix indicator (PMI) and the additional deflection phase angle for the each RIS unit group to the network device, and the network device will forward them to the RIS array. Additionally, or alternatively, the terminal device may send the PMI and the additional deflection phase angle for the each RIS unit group directly to the RIS array.

It can be understood that after receiving the precoding matrix indicator (PMI) and the additional deflection angle for each RIS unit group sent by the terminal device or the network device, the RIS array can precode each RIS unit group according to the precoding matrix indicator (PMI) and the additional deflection angle for the each RIS unit group.

By implementing the embodiment of the present disclosure, the first indication information received by the RIS array indicates the PMI and the additional deflection phase angle for each RIS unit group, and then the RIS array can precode each RIS unit group. As a result, not only the problem that the precoding scheme fails because the RIS array does not meet the far-field hypothesis is avoided, but also the complexity of RIS precoding is reduced.

Figure 9:
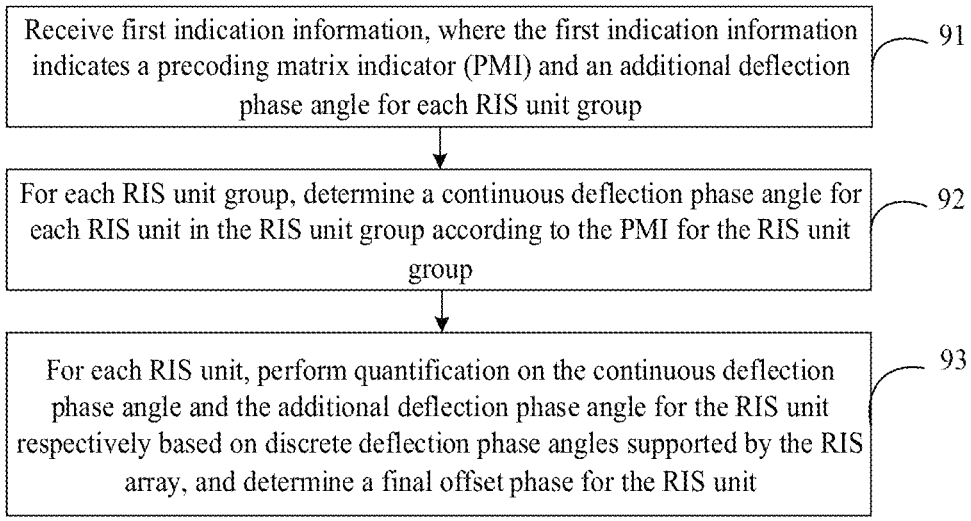
FIG. 9 is a schematic flowchart of precoding of a reconfigurable intelligent surface (RIS) according to an embodiment of the present disclosure.

Referring to FIG. 9, FIG. 9 is another schematic flowchart of precoding of a reconfigurable intelligent surface (RIS) according to an embodiment of the present disclosure. The method is configured to be performed by an RIS array. As shown in FIG. 9, the method may include, but is not limited to, steps 91-93.

At step 91, first indication information is received, where the first indication information indicates a precoding matrix indicator (PMI) and an additional deflection phase angle for each RIS unit group; where the precoding matrix indicator (PMI) and the additional deflection phase angle for the each RIS unit group are determined by a terminal device according to channel information of the each RIS unit group in the RIS array.

The specific implementation forms of step 91 can refer to the detailed steps in other embodiments of the present disclosure, and will not be described in detail here.

At step 92, for each RIS unit group, a continuous deflection phase angle for each RIS unit in the RIS unit group is determined according to the PMI for the RIS unit group.

In some examples, for the each RIS unit group, the RIS array may first determine a horizontal-dimensional beamforming vector and a vertical-dimensional beamforming vector for the RIS unit group based on the PMI for the RIS unit group, and then determine the continuous deflection phase angle for each RIS unit in the RIS unit group according to the horizontal-dimensional beamforming vector and the vertical-dimensional beamforming vector for the RIS unit group.

It can be understood that the PMI for each RIS unit group is associated with one horizontal-dimensional beamforming vector and one vertical-dimensional beamforming vector respectively. Therefore, for the each RIS unit group, after determining the horizontal-dimensional beamforming vector and the vertical-dimensional beamforming vector for the RIS unit group, the horizontal beamforming vector and the vertical beamforming vector for the RIS unit group can be multiplied to obtain a precoding matrix, that is, the continuous deflection phase angle for each RIS unit in the RIS unit group can be determined.

At step 93, for each RIS unit, quantification is performed on the continuous deflection phase angle and the additional deflection phase angle for the RIS unit respectively based on discrete deflection phase angles supported by the RIS array, and a final offset phase for the RIS unit is determined.

In some examples, for each RIS unit, the RIS array may first determine a discrete deflection phase angle with a smallest absolute value of a difference from the continuous deflection phase angle for the RIS unit as a discrete deflection phase angle for the RIS unit. Then, the RIS array determines a discrete deflection phase angle with a smallest absolute value of a difference from the additional deflection phase angle for the RIS unit as a quantized additional deflection phase angle for the RIS unit. Finally, the RIS array determines a sum of the discrete deflection phase angle and the quantized additional deflection phase angle for the RIS unit as the final offset phase for the RIS unit.

For example, a continuous deflection phase angle of RIS #1 unit is $\omega$, an additional deflection phase angle of RIS #1 unit is $\omega_d$, and discrete deflection phase angles supported by RIS array are $\omega 1$, $\omega 2$, $\omega 3$ and $\omega 4$. If a discrete deflection phase angle with a smallest absolute value of a difference from the continuous deflection phase angle $\omega$ for RIS #1 unit is $\omega 1$, $\psi 1$ is a discrete deflection phase angle for RIS #1 unit. If a discrete deflection phase angle with a smallest absolute value of a difference from the additional deflection phase angle $\omega_d$ for RIS #1 unit is $\omega 3$, $\omega 3$ is a quantized additional deflection phase angle for RIS #1. Then a final offset phase for RIS #1 unit is $\omega 1+\omega 3$. This example is only a simple illustration, and should not be used as a specific definition of the continuous deflection phase angle, the additional deflection phase angle, and the final offset phase for each RIS unit in the embodiment of the present disclosure.

By implementing the embodiments of the present disclosure, the RIS array first receives the first indication information indicating the precoding matrix indicator (PMI) and additional deflection phase angle for each RIS unit group, and for the each RIS unit group, determines the continuous deflection phase angle for each RIS unit in the RIS unit group according to the PMI for the RIS unit group, and then, based on the discrete deflection phase angles supported by the RIS array, quantizes the continuous deflection phase angle and additional deflection phase angle for the each RIS unit respectively, and determines the final offset phase for the each RIS unit. Thus, by performing grouping operation on the RIS array and determining the final offset phase for each RIS unit in the RIS array according to the PMI and the additional deflection phase angle for each RIS unit group, not only the problem that the precoding scheme fails because the RIS array does not meet the far-field hypothesis is avoided, but also the complexity of RIS precoding is reduced.

Figure 10:
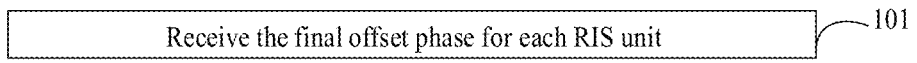
FIG. 10 is a schematic flowchart of precoding of a reconfigurable intelligent surface (RIS) according to an embodiment of the present disclosure.

Referring to FIG. 10, FIG. 10 is another schematic flowchart of precoding of a reconfigurable intelligent surface (RIS) according to an embodiment of the present disclosure. The method is configured to be performed by an RIS array. As shown in FIG. 10, the method may include, but is not limited to, steps 101.

At step 101, the final offset phase for each RIS unit is received.

In the case where the terminal device sends the precoding matrix indicator (PMI) and the additional deflection phase angle for each RIS unit group to the network device, the final offset phase for each RIS unit may be determined by the network device. Thus, the RIS array may receive the final offset phase for each RIS unit as determined by the network device.

In some examples, the RIS array can receive the final offset phase for each RIS unit sent by the terminal device; or, the RIS array can also receive the final offset phase for each RIS unit sent by the network device. That is, after determining the final offset phase for each RIS unit, the network device can directly send the final offset phase for each RIS unit to the RIS array. Or, the network device can also send the final offset phase for each RIS unit to the terminal device, and the terminal device forwards the final offset phase to the RIS array.

By implementing the embodiments of the present disclosure, the network device first determines the final offset phase for each RIS unit in the RIS array according to the precoding matrix indicator (PMI) and additional deflection phase angle for each RIS unit group, and then the RIS array receives the final offset phase for the each RIS unit determined by the network device. As a result, not only the problem that the precoding scheme fails because the RIS array does not meet the far-field hypothesis is avoided, but also the complexity of RIS precoding is reduced.

In the included embodiments provided by the present disclosure, the methods provided by the embodiments of the present disclosure are introduced from the perspectives of a core network device, a terminal device, and an access network device, respectively. In order to realize each of the functions in the method provided in the included embodiments of the present disclosure, the core network device, the terminal device, and the access network device may include a hardware structure, a software module, and the included functions are realized in the form of hardware structure, software module, or hardware structure plus software module. Any of the included functions can be implemented in a hardware structure, a software module, or a combination of hardware structure and software module.

Figure 11:
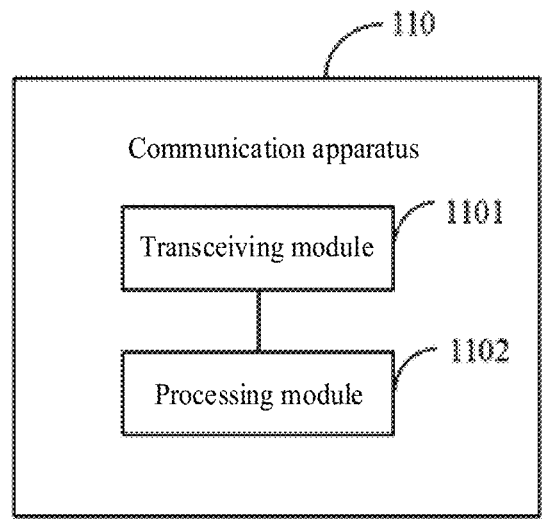
FIG. 11 is a schematic structural diagram of a communication apparatus according to an embodiment of the present disclosure.

Referring to FIG. 11, FIG. 11 is a schematic structural diagram of a communication apparatus 110 according to an embodiment of the present disclosure. The communication apparatus 110 shown in FIG. 11 may include a transceiving module 1101 and a processing module 1102. The transceiving module 1101 may include a sending module and/or a receiving module, where the sending module is configured to realize a sending function and the receiving module is configured to realize a receiving function, and the transceiving module 1101 may realize the sending function and/or the receiving function.

The communication apparatus 110 may be a terminal device (such as the terminal device in the aforementioned method embodiments), an apparatus in the terminal device, or an apparatus that can be used in conjunction with the terminal device. The communication apparatus 110 may be a network device (such as the network device in the aforementioned method embodiments), an apparatus in the network device, or an apparatus that can be used in conjunction with the network device. Additionally, the communication apparatus 110 may further be an RIS array, an apparatus in the RIS array, or an apparatus that can be used in conjunction with the RIS array.

Specifically, if the communication apparatus 110 is a terminal device (such as the terminal device in the aforementioned method embodiment): the processing module 1102 is configured to determine a precoding matrix indicator (PMI) and an additional deflection phase angle for each RIS unit group in an RIS array according to channel information of the each RIS unit group; and the transceiving module 1101 is configured to send first indication information, where the first indication information indicates the precoding matrix indicator and the additional deflection phase angle for the each RIS unit group.

In some examples, the transceiving module 1101 is further specifically configured to: receive second indication information, where the second indication information indicates RIS unit groups included in the RIS array.

In some examples, the transceiving module 1101 is further specifically configured to: send the first indication information to the RIS array; or send the first indication information to a network device.

In some examples, the transceiving module 1101 is further configured to receive third indication information, where the third indication information indicates a number of rows and a number of columns of RIS units included in the RIS array; and the processing module 1102 is further configured to perform grouping operation on the RIS array according to a preset rule and the number of rows and the number of columns of RIS units included in the RIS array.

In some examples, the preset rule includes any one of: grouping RIS units in every continuous M rows and continuous N columns into one group; grouping RIS units in every continuous L rows and spaced S columns into one group; grouping RIS units in every spaced P rows and continuous Q columns into one group; or grouping RIS units in every spaced F rows and spaced R columns into one group. Where M, N, L, S, P, Q, F, and R are positive integers, respectively.

In some examples, the transceiving module 1101 is further specifically configured to: receive the third indication information sent by a network device.

According to the communication apparatus proposed in the present disclosure, the terminal device first determines the precoding matrix indicator (PMI) and additional deflection phase angle for each RIS unit group based on the channel information of the each RIS unit group in the RIS array, and then indicates the precoding matrix indicator and the additional deflection phase angle for the each RIS unit group to the network device or the RIS array, so that the network device or the RIS array can precode each RIS unit group. As a result, not only the problem that the precoding scheme fails because the RIS array does not meet the far-field hypothesis is avoided, but also the complexity of RIS precoding is reduced.

If the communication apparatus 110 is a network device (such as the network device in the aforementioned method embodiment): the transceiving module 1101 is configured to receive first indication information, where the first indication information indicates a precoding matrix indicator (PMI) and an additional deflection phase angle for each RIS unit group in an RIS array; where the precoding matrix indicator (PMI) and the additional deflection phase angle for the each RIS unit group are determined by a terminal device according to channel information of the each RIS unit group in the RIS array.

In some examples, the transceiving module 1101 is further specifically configured to: receive the first indication information sent by the terminal device.

In some examples, the transceiving module 1101 is further specifically configured to: send second indication information, where the second indication information indicates RIS unit groups included in the RIS array.

In some examples, it further includes a processing module 1102, which is specifically configured to: determine a number of rows and a number of columns of RIS units included in the RIS array; and perform grouping operation on the RIS array according to a preset rule and the number of rows and columns of RIS units included in the RIS array.

In some examples, the preset rule includes any one of: grouping RIS units in every continuous M rows and continuous N columns into one group; grouping RIS units in every continuous L rows and spaced S columns into one group; grouping RIS units in every spaced P rows and continuous Q columns into one group; or grouping RIS units in every spaced F rows and spaced R columns into one group. Where M, N, L, S, P, Q, F, and R are positive integers, respectively.

In some examples, the processing module 1102 is further specifically configured to: for the each RIS unit group, determine a continuous deflection phase angle for each RIS unit in the RIS unit group according to the PMI for the RIS unit group; and for the each RIS unit, perform quantification on the continuous deflection phase angle and the additional deflection phase angle for the RIS unit respectively based on discrete deflection phase angles supported by the RIS array, and determine a final offset phase for the RIS unit.

In some examples, the processing module 1102 is further specifically configured to: determine a horizontal-dimensional beamforming vector and a vertical-dimensional beamforming vector for the RIS unit group according to the PMI for the RIS unit group; and determine the continuous deflection phase angle for each RIS unit in each RIS unit group according to the horizontal-dimensional beamforming vector and the vertical-dimensional beamforming vector for the RIS unit group.

In some examples, the processing module 1102 is further specifically configured to: determine a discrete deflection phase angle with a smallest absolute value of a difference from the continuous deflection phase angle for the RIS unit as a discrete deflection phase angle for the RIS unit; determine a discrete deflection phase angle with a smallest absolute value of a difference from the additional deflection phase angle for the RIS unit as a quantized additional deflection phase angle for the RIS unit; and determine a sum of the discrete deflection phase angle and the quantized additional deflection phase angle for the RIS unit as the final offset phase for the RIS unit.

In some examples, the transceiving module 1101 is further specifically configured to: send third indication information, where the third indication information indicates a number of rows and a number of columns of RIS units included in the RIS array.

In some examples, the transceiving module 1101 is further specifically configured to: send the final offset phase for the each RIS unit to the RIS array; or send the final offset phase for the each RIS unit to the terminal device.

According to the communication apparatus proposed in the present disclosure, the first indication information received by the network device indicates the PMI and the additional deflection phase angle for each RIS unit group, and then the network device can precode each RIS unit group. As a result, not only the problem that the precoding scheme fails because the RIS array does not meet the far-field hypothesis is avoided, but also the complexity of RIS precoding is reduced.

If the communication apparatus 110 is an RIS array (such as the RIS array in the aforementioned method embodiments): the transceiving module 1101 is configured to receive first indication information, where the first indication information indicates a precoding matrix indicator (PMI) and an additional deflection phase angle for each RIS unit group in the RIS array; where the precoding matrix indicator (PMI) and the additional deflection phase angle for the each RIS unit group are determined by a terminal device according to channel information of the each RIS unit group in the RIS array.

In some examples, the transceiving module 1101 is further specifically configured to: receive the first indication information sent by a network device; or receive the first indication information sent by the terminal device.

In some examples, it further includes a processing module 1102, which is specifically configured to: for the each RIS unit group, determine a continuous deflection phase angle for each RIS unit in the RIS unit group according to the PMI for the RIS unit group; and for the each RIS unit, perform quantification on the continuous deflection phase angle and the additional deflection phase angle for the RIS unit respectively based on discrete deflection phase angles supported by the RIS array, and determine a final offset phase for the RIS unit.

In some examples, the processing module 1102 is specifically configured to: determine a horizontal-dimensional beamforming vector and a vertical-dimensional beamforming vector for the RIS unit group according to the PMI for the RIS unit group; and determine the continuous deflection phase angle for each RIS unit in the RIS unit group according to the horizontal-dimensional beamforming vector and the vertical-dimensional beamforming vector for the RIS unit group.

In some examples, the processing module 1102 is further specifically configured to: determine a discrete deflection phase angle with a smallest absolute value of a difference from the continuous deflection phase angle for the RIS unit as a discrete deflection phase angle for the RIS unit; determine a discrete deflection phase angle with a smallest absolute value of a difference from the additional deflection phase angle for the RIS unit as a quantized additional deflection phase angle for the RIS unit; and determine a sum of the discrete deflection phase angle and the quantized additional deflection phase angle for the RIS unit as the final offset phase for the RIS unit.

In some examples, the transceiving module 1101 is further specifically configured to: receive a final offset phase for each RIS unit.

In some examples, the transceiving module 1101 is further specifically configured to: receive the final offset phase for each RIS unit sent by the terminal device; or receive the final offset phase for each RIS unit sent by a network device.

According to the communication apparatus proposed in the present disclosure, the first indication information received by the RIS array indicates the PMI and the additional deflection phase angle for each RIS unit group, and then the RIS array can precode each RIS unit group. As a result, not only the problem that the precoding scheme fails because the RIS array does not meet the far-field hypothesis is avoided, but also the complexity of RIS precoding is reduced.

Figure 12:
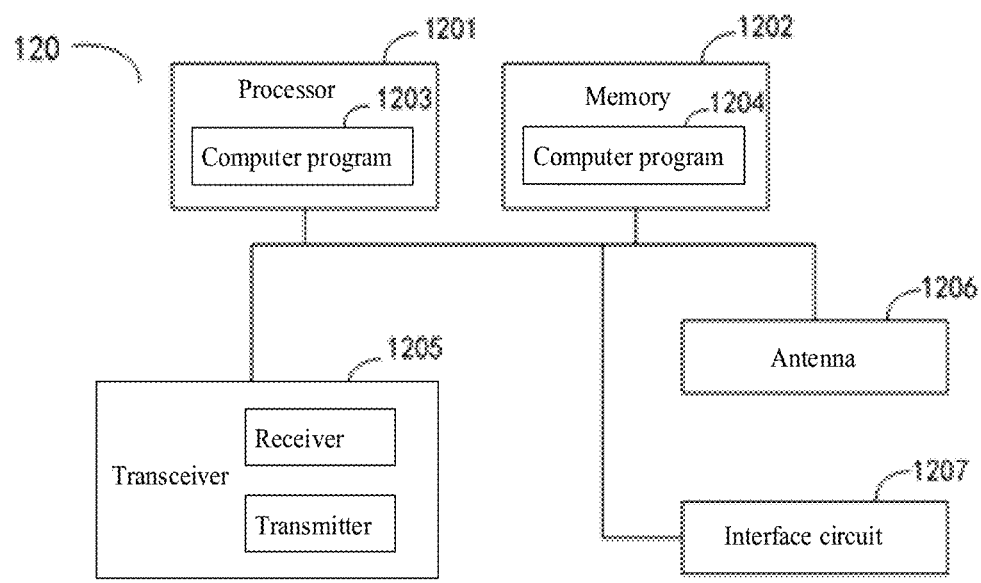
FIG. 12 is a schematic structural diagram of another communication apparatus according to an embodiment of the present disclosure.

Referring to FIG. 12, FIG. 12 is a schematic structural diagram of another communication apparatus 120 according to an embodiment of the present disclosure. The communication apparatus 120 may be a network device, a terminal device (such as the terminal device in the included method embodiments), an RIS array, a chip, a chip system, or a processor that supports the network device to realize the included methods, a chip, a chip system, or a processor that supports the terminal device to realize the included methods, or a chip, a chip system, or a processor that supports the RIS array to realize the included methods. The apparatus can be configured to realize the methods described in the included method embodiments, for details, please refer to the description in the included method embodiments.

The communication apparatus 120 may include one or more processors 1201. The processor 1201 may be a general-purpose processor or a specialized processor, etc. Such as a baseband processor or a central processing unit. The baseband processor can be configured to process communication protocols as well as communication data, and the central processor can be configured to control a communication apparatus (e.g., a base station, a baseband chip, a terminal device, a terminal device chip, a DU or a CU, etc.), execute a computer program, and process data from a computer program.

In some examples, the communication apparatus 120 may further include one or more memories 1202, on which a computer program 1204 may be stored, and the processor 1201 executes the computer program 1204, so that the communication apparatus 120 can execute the methods described in the included method embodiments. In some examples, data can also be stored in the memory 1202. The communication apparatus 120 and the memory 1202 may be set separately or integrated together.

In some examples, the communication apparatus 120 may further include a transceiver 1205 and an antenna 1206. The transceiver 1205 can be called a transceiver unit, a transceiver machine, a transceiver circuit, etc., and is configured to realize transceiver functions. The transceiver 1205 may include a receiver and a transmitter, and the receiver may be called a receiving machine or a receiving circuit, etc., and is configured to realize receiving functions. The transmitter can be called a transmitting machine or a transmitting circuit, etc., and is configured to realize transmitting functions.

In some examples, the communication apparatus 120 may further include one or more interface circuits 1207. The interface circuit 1207 is configured to receive code instructions and transmit them to the processor 1201. The processor 1201 executes the code instructions to cause the communication apparatus 120 to perform the methods described in the included method embodiments.

The communication apparatus 120 is a terminal device (such as the terminal device in the included-method embodiments): the transceiver 1205 and is configured to execute step 22 in FIG. 2, step 31 and step 33 in FIG. 3, step 41 and step 44 in FIG. 4, etc. The processor 1201 is configured to execute step 21 of FIG. 2; step 32 of FIG. 3, step 42 and step 43 of FIG. 4, etc.

The communication apparatus 120 is a network device, and the transceiver 1205 is configured to execute step 51 in FIG. 5, and is further configured to execute step 63 and step 64 in FIG. 6, step 71 and step 74 in FIG. 7, etc. The processor 1201 is configured to execute step 61 and step 62 in FIG. 6, step 72 and step 73 in FIG. 7, etc.

The communication apparatus 120 is an RIS matrix, and the transceiver 1205 can be configured to execute step 81 in FIG. 8, step 91 in FIG. 9, step 101 in FIG. 10, etc. The processor 1201 can be configured to execute step 92 and step 93 in FIG. 9, etc.

In an implementation, the processor 1201 may include a transceiver for implementing receiving and transmitting functions. For example, the transceiver can be a transceiver circuit, an interface, or an interface circuit. Transceiver circuits, interfaces or interface circuits for receiving and transmitting functions can be separated or integrated. The transceiver circuit, interface or interface circuit can be configured to read and write codes/data, or the transceiver circuit, interface or interface circuit can be configured to signal transmission or delivery.

In an implementation, the processor 1201 can store a computer program 1203, and the computer program 1203 runs on the processor 1201, which can make the communication apparatus 120 execute the methods described in the included method embodiments. The computer program 1203 may be solidified in the processor 1201, in which case, the processor 1201 may be implemented by hardware.

In an implementation, the communication apparatus 120 may include a circuit, which may realize the function of transmitting or receiving or communicating in the included method embodiments. The processor and transceiver described in the present disclosure can be implemented on an integrated circuit (IC), an analog IC, a radio frequency integrated circuit (RFIC), a mixed-signal IC, an application specific integrated circuit (ASIC), a printed circuit board (PCB), an electronic device, etc. The processor and transceiver can also be manufactured by various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), etc.

The communication apparatus in the included description of embodiments may be an RIS array, a network device, or a terminal device (such as the terminal device in the previous method embodiments), but the scope of the communication apparatus described in the present disclosure is not limited thereto, and the structure of the communication apparatus may not be limited by FIG. 12. The communication apparatus may be a stand-alone device or may be part of a larger device. For example, the communication apparatus may be: (1) a stand-alone integrated circuit IC, or chip, or system or subsystem of chips; (2) a collection of ICs having one or more ICs, in some examples, the collection of ICs may also include storage components for storing data, computer programs; (3) an ASIC, such as a modem; (4) a module that can be embedded in other devices; (5) a receiver, a terminal device, an intelligent terminal device, a cellular phone, a wireless device, handset, mobile unit, a vehicle-mounted device, a network device, a cloud device, an artificial intelligence device, etc.; (6) others, etc.

Figure 13:
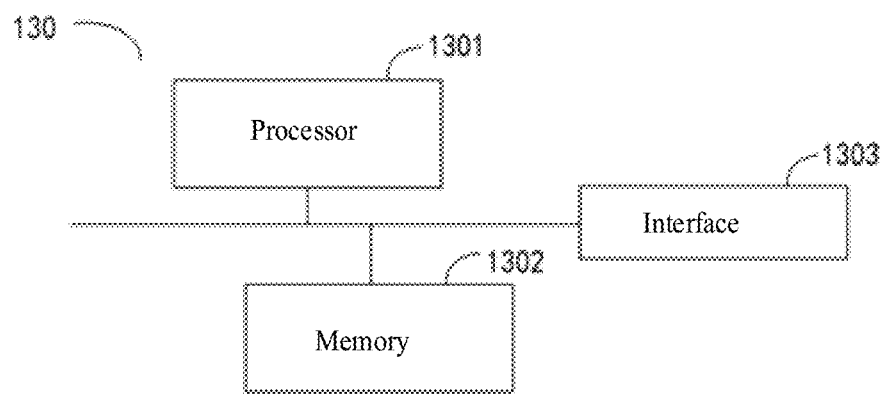
FIG. 13 is a schematic structural diagram of a chip according to an embodiment of the present disclosure.

For the case that the communication apparatus can be a chip or a chip system, please refer to a structural schematic diagram of the chip 130 shown in FIG. 13. The chip 130 shown in FIG. 13 includes a processor 1301 and an interface 1303. The number of processors 1301 may be one or more and the number of interfaces 1303 may be more than one.

For the case where the chip 130 is configured to realize the function of the terminal device in the embodiments of the present disclosure, the interface 1303 is configured to execute step 22 of FIG. 2; step 31 and step 33 of FIG. 3, step 41 and step 44 of FIG. 4, etc. The processor 1301 is configured to execute step 21 of FIG. 2; step 32 of FIG. 3, step 42 and step 43 of FIG. 4, etc.

For the case where the chip 130 is configured to realize the function of the network device in the embodiments of the present disclosure, the interface 1303 is configured to execute step 51 in FIG. 5, and is further configured to execute step 63 and step 64 in FIG. 6, step 71 and step 74 in FIG. 7, etc. The processor 1301 is configured to execute step 61 and step 62 in FIG. 6, step 72 and step 73 in FIG. 7, etc.

For the case where the chip 130 is configured to realize the function of the RIS array in the embodiments of the present disclosure, the interface 1303 is configured to execute step 81 in FIG. 8, step 91 in FIG. 9, step 101 in FIG. 10, etc. The processor 1301 can be configured to execute step 92 and step 93 in FIG. 9, etc.

In some examples, the chip 130 further includes a memory 1302 for storing necessary computer programs and data. The processor 1301, the memory 1302 and the interface 1303 are all communicatively coupled to each other by any known system such as a network or BUS.

Those skilled in the art can also understand that various illustrative logical blocks and steps listed in the embodiments of the present disclosure can be implemented by electronic hardware, computer software, or a combination of both. Whether such a function is realized in hardware or software depends on specific application and design requirements of an overall system. Those skilled in the art can use various methods to realize the described functions for each specific application, but this realization should not be understood as beyond the scope of protection of the embodiments of the present disclosure.

An embodiment of the present disclosure further provides a communication system, which includes a communication apparatus as a terminal device and a communication apparatus as a network device in the embodiment of FIG. 11, or the system includes a communication apparatus as a terminal device and a communication apparatus as a network device in the embodiment of FIG. 12.

The present disclosure further provides a readable storage medium on which instructions are stored, which, when executed by a computer, realize the functions of any of the included method embodiments.

The present disclosure further provides a computer program product which, when executed by a computer, realizes the functions of any of the included method embodiments.

Embodiments of the present disclosure provide methods and apparatuses for precoding a reconfigurable intelligent surface (RIS), which can be applied to the field of communication technologies.

In a first aspect, an embodiment of the present disclosure provides a method of precoding a reconfigurable intelligent surface (RIS), performed by a terminal device, including: determining a precoding matrix indicator (PMI) and an additional deflection phase angle for each RIS unit group in an RIS array according to channel information of the each RIS unit group; and sending first indication information, where the first indication information indicates the precoding matrix indicator and the additional deflection phase angle for the each RIS unit group.

In an implementation, the method further includes: receiving second indication information, where the second indication information indicates RIS unit groups included in the RIS array.

In an implementation, sending the first indication information includes: sending the first indication information to the RIS array; or sending the first indication information to a network device.

In an implementation, the method further includes: receiving third indication information, where the third indication information indicates a number of rows and a number of columns of RIS units included in the RIS array; and performing grouping operation on the RIS array according to a preset rule and the number of rows and the number of columns of RIS units included in the RIS array.

In an implementation, the preset rule includes any one of: grouping RIS units in every continuous M rows and continuous N columns into one group; grouping RIS units in every continuous L rows and spaced S columns into one group; grouping RIS units in every spaced P rows and continuous Q columns into one group; or grouping RIS units in every spaced F rows and spaced R columns into one group; where M, N, L, S, P, Q, F, and R are positive integers, respectively.

In an implementation, receiving the third indication information includes: receiving the third indication information sent by a network device.

In a second aspect, an embodiment of the present disclosure provides a method of precoding a reconfigurable intelligent surface (RIS), performed by a network device, including: receiving first indication information, where the first indication information indicates a precoding matrix indicator (PMI) and an additional deflection phase angle for each RIS unit group in an RIS array; where the PMI and the additional deflection phase angle for the each RIS unit group are determined by a terminal device according to channel information of the each RIS unit group in the RIS array.

In an implementation, receiving the first indication information includes: receiving the first indication information sent by the terminal device.

In an implementation, the method further includes: sending second indication information, where the second indication information indicates RIS unit groups included in the RIS array.

In an implementation, the method further includes: determining a number of rows and a number of columns of RIS units included in the RIS array; and performing grouping operation on the RIS array according to a preset rule and the number of rows and the number of columns of RIS units included in the RIS array.

In an implementation, the preset rule includes any one of: grouping RIS units in every continuous M rows and continuous N columns into one group; grouping RIS units in every continuous L rows and spaced S columns into one group; grouping RIS units in every spaced P rows and continuous Q columns into one group; or grouping RIS units in every spaced F rows and spaced R columns into one group; where M, N, L, S, P, Q, F, and R are positive integers, respectively.

In an implementation, the method further includes: for the each RIS unit group, determining a continuous deflection phase angle for each RIS unit in the RIS unit group according to the PMI for the RIS unit group; and for the each RIS unit, performing quantification on the continuous deflection phase angle and the additional deflection phase angle for the RIS unit respectively based on discrete deflection phase angles supported by the RIS array, and determining a final offset phase for the RIS unit.

In an implementation, for the each RIS unit group, determining the continuous deflection phase angle for each RIS unit in the RIS unit group according to the PMI for the RIS unit group includes: determining a horizontal-dimensional beamforming vector and a vertical-dimensional beamforming vector for the RIS unit group according to the PMI for the RIS unit group; and determining the continuous deflection phase angle for each RIS unit in the RIS unit group according to the horizontal-dimensional beamforming vector and the vertical-dimensional beamforming vector for the RIS unit group.

In an implementation, for the each RIS unit, determining the final offset phase for the RIS unit includes: determining a discrete deflection phase angle with a smallest absolute value of a difference from the continuous deflection phase angle for the RIS unit as a discrete deflection phase angle for the RIS unit; determining a discrete deflection phase angle with a smallest absolute value of a difference from the additional deflection phase angle for the RIS unit as a quantized additional deflection phase angle for the RIS unit; and determining a sum of the discrete deflection phase angle and the quantized additional deflection phase angle for the RIS unit as the final offset phase for the RIS unit.

In an implementation, the method further includes: sending third indication information, where the third indication information indicates a number of rows and a number of columns of RIS units included in the RIS array.

In an implementation, the method further includes: sending the final offset phase for the each RIS unit to the RIS array; or sending the final offset phase for the each RIS unit to the terminal device.

In a third aspect, an embodiment of the present disclosure provides a method of precoding a reconfigurable intelligent surface (RIS), performed by an RIS array, including: receiving first indication information, where the first indication information indicates a precoding matrix indicator (PMI) and an additional deflection phase angle for each RIS unit group in the RIS array; where the PMI and the additional deflection phase angle for the each RIS unit group are determined by a terminal device according to channel information of the each RIS unit group in the RIS array.

In an implementation, receiving the first indication information includes: receiving the first indication information sent by a network device; or receiving the first indication information sent by the terminal device.

In an implementation, the method further includes: for the each RIS unit group, determining a continuous deflection phase angle for each RIS unit in the RIS unit group according to the PMI for the RIS unit group; and for the each RIS unit, performing quantification on the continuous deflection phase angle and the additional deflection phase angle for the RIS unit respectively based on discrete deflection phase angles supported by the RIS array, and determining a final offset phase for the RIS unit.

In an implementation, for the each RIS unit group, determining the continuous deflection phase angle for each RIS unit in the RIS unit group according to the PMI for the RIS unit group includes: determining a horizontal-dimensional beamforming vector and a vertical-dimensional beamforming vector for the RIS units according to the PMI for the RIS unit group; and determining the continuous deflection phase angle for each RIS unit in the RIS unit group according to the horizontal-dimensional beamforming vector and the vertical-dimensional beamforming vector for the RIS unit group.

In an implementation, for the each RIS unit, determining the final offset phase for the RIS unit includes: determining a discrete deflection phase angle with a smallest absolute value of a difference from the continuous deflection phase angle for the RIS unit as a discrete deflection phase angle for the RIS unit; determining a discrete deflection phase angle with a smallest absolute value of a difference from the additional deflection phase angle for the RIS unit as a quantized additional deflection phase angle for the RIS unit; and determining a sum of the discrete deflection phase angle and the quantized additional deflection phase angle for the RIS unit as the final offset phase for the RIS unit.

In an implementation, the method further includes: receiving a final offset phase for each RIS unit.

In an implementation, receiving the final offset phase for each RIS unit includes: receiving the final offset phase for each RIS unit sent by a terminal device; or receiving the final offset phase for each RIS unit sent by a network device.

In a fourth aspect, an embodiment of the present disclosure provides a communication apparatus, which has a function of realizing part or all of the terminal device in the method described in the first aspect. For example, the function of the apparatus may have a function of part or all of the embodiments in the present disclosure, or it may have a function of independently implementing any one of the embodiments in the present disclosure. The functions can be realized by hardware, or by hardware executing corresponding software. The hardware or software includes one or more units or modules corresponding to the included functions.

In a fifth aspect, an embodiment of the present disclosure provides a communication apparatus, which has a function of realizing part or all of the network device in the method described in the second aspect. For example, the function of the apparatus may have a function of part or all of the embodiments in the present disclosure, or it may have a function of independently implementing any one of the embodiments in the present disclosure. The functions can be realized by hardware, or by hardware executing corresponding software. The hardware or software includes one or more units or modules corresponding to the included functions.

In a sixth aspect, an embodiment of the present disclosure provides a communication apparatus, which has a function of realizing part or all of the RIS array in the method described in the second aspect. For example, the function of the apparatus may have a function of part or all of the embodiments in the present disclosure, or it may have a function of independently implementing any one of the embodiments in the present disclosure. The functions can be realized by hardware, or by hardware executing corresponding software. The hardware or software includes one or more units or modules corresponding to the included functions.

In an implementation, a structure of the included apparatus may include a transceiving module and a processing module, and the processing module is configured to support the apparatus to perform the corresponding functions in the included method. The transceiving module is configured to support a communication between the apparatus and other device. The device may further include a storage module for coupling with the transceiving module and the processing module, and storing necessary computer programs and data of the communication apparatus.

As an example, the processing module can be a processor, the transceiving module can be a transceiver or communication interface, and the storage module can be a memory.

In a seventh aspect, an embodiment of the present disclosure provides a communication apparatus, which includes a processor, and when the processor calls a computer program in a memory, the method described in the first aspect is executed.

In an eighth aspect, an embodiment of the present disclosure provides a communication apparatus, which includes a processor, and when the processor calls a computer program in a memory, the method described in the second aspect is executed.

In a ninth aspect, an embodiment of the present disclosure provides a communication apparatus, which includes a processor, and when the processor calls a computer program in a memory, the method described in the third aspect is executed.

In a tenth aspect, an embodiment of the present disclosure provides a communication apparatus, which includes a processor and a memory, where a computer program is stored in the memory; the processor executes the computer program stored in the memory to cause the communication apparatus to perform the method described in the first aspect.

In an eleventh aspect, an embodiment of the present disclosure provides a communication apparatus, which includes a processor and a memory, where a computer program is stored in the memory; the processor executes the computer program stored in the memory to cause the communication apparatus to perform the method described in the second aspect.

In a twelfth aspect, an embodiment of the present disclosure provides a communication apparatus, which includes a processor and a memory, where a computer program is stored in the memory; the processor executes the computer program stored in the memory to cause the communication apparatus to perform the method described in the third aspect.

In a thirteenth aspect, an embodiment of the present disclosure provides a computer-readable storage medium for storing instructions for the terminal device, which, when executed, causes the terminal device to perform the method described in the first aspect.

In a fourteenth aspect, an embodiment of the present disclosure provides a computer-readable storage medium for storing instructions for the network device, which, when executed, cause the network device to perform the method described in the second aspect.

In a fifteenth aspect, an embodiment of the present disclosure provides a computer-readable storage medium for storing instructions for the RIS array, which, when executed, cause the network device to perform the method described in the third aspect.

In a sixteenth aspect, the present disclosure further provides a computer program product including a computer program, which, when run on a computer, causes the computer to perform the method described in the first aspect.

In a seventeenth aspect, the present disclosure further provides a computer program product including a computer program, which, when run on a computer, causes the computer to perform the method described in the second aspect.

In an eighteenth aspect, the present disclosure further provides a computer program product including a computer program, which, when run on a computer, causes the computer to perform the method described in the third aspect.

In a nineteenth aspect, the present disclosure provides a chip system, which includes at least one processor and an interface, and is configured to support a terminal device to realize the functions related to the first aspect, for example, determining or processing at least one of data and information related to the included method. In a possible design, the chip system further includes a memory for storing necessary computer programs and data for a terminal device. The chip system can be composed of chips or include chips and other discrete devices.

In a twentieth aspect, the present disclosure provides a chip system, which includes at least one processor and an interface, and is configured to support a network device to realize the functions related to the second aspect, for example, determining or processing at least one of data and information related to the included method. In a possible design, the chip system further includes a memory for storing necessary computer programs and data for a network device. The chip system can be composed of chips or include chips and other discrete devices.

In a twenty-first aspect, the present disclosure provides a chip system, which includes at least one processor and an interface, and is configured to support an RIS array to realize the functions related to the third aspect, for example, determining or processing at least one of data and information related to the included method. In a possible design, the chip system further includes a memory for storing necessary computer programs and data for a network device. The chip system can be composed of chips or include chips and other discrete devices.

In a twenty-second aspect, the present disclosure provides a computer program which, when run on a computer, causes the computer to perform the method described in the first aspect.

In a twenty-third aspect, the present disclosure provides a computer program which, when run on a computer, causes the computer to perform the method described in the second aspect included.

In a twenty-fourth aspect, the present disclosure provides a computer program which, when run on a computer, causes the computer to perform the method described in the third aspect included.

In the included embodiments, it can be realized in whole or in part by software, hardware, firmware or any combination thereof. When implemented using software, it may be implemented in whole or in part in the form of a computer program product. The computer program product includes one or more computer programs. When the computer program is loaded and executed on a computer, the flow or function according to the embodiments of the present disclosure is generated in whole or in part. The computer can be a general-purpose computer, a special-purpose computer, a computer network, or other programmable devices. The computer program can be stored in a computer-readable storage medium or transmitted from one computer-readable storage medium to another. For example, the computer program can be transmitted from a website, computer, server or data center to another website by wired (e.g., coaxial cable, optical fiber, digital subscriber line (DSL)) or wireless (e.g., infrared, wireless, microwave, etc.). The computer-readable storage medium may be any available medium that can be accessed by a computer or a data storage device such as a server, data center, etc., that contains one or more available media integrated. The available medium may be a magnetic medium (e.g., floppy disk, hard disk, magnetic tape), an optical medium (e.g., high-density digital video disc (DVD)), or a semiconductor medium (e.g., solid state disk (SSD)), etc.

A person of ordinary skill in the art may understand that "first", "second", and other various numerical numbers involved in the present disclosure are only described for the convenience of differentiation, and are not used to limit the scope of the embodiments of the present disclosure, nor do they indicate the order of precedence.

"At least one" in the present disclosure can further be described as one or more, and "a plurality" can be two, three, four or more, and the present disclosure is not limited. In the embodiments of the present disclosure, for a technical feature, the technical feature is distinguished by "first", "second", "third", "A", "B", "C" and "D" etc. The technical features described in "first", "second", "third", "A", "B", "C" and "D" are in no order of priority or size.

It should be understood that although terms first, second, third, etc. may be used to describe various information in the embodiments of the present disclosure, these information should not be limited to these terms. These terms are used only to distinguish the same type of information from one another. For example, without departing from the scope of the embodiments of the present disclosure, first information can also be called second information, and similarly, the second information can also be called the first information. The words "if" and "in a case" as used herein may be interpreted to mean "at" or "when" or "in response to a determining" or "under the circumstances".

The correspondence shown in each table in the present disclosure can be configured or predefined. The values of the information in each table are only examples, and can be configured as other values, and the present disclosure is not limited. When configuring a correspondence between the information and each parameter, it is not necessary to configure all correspondences illustrated in each table. For example, in the table in the present disclosure, corresponding relationships shown by some rows may not be configured. For another example, appropriate deformation adjustments can be made based on the above table, such as splitting, merging, etc. The names of the parameters shown in the titles of the above tables may also be other names understandable by the communication apparatus, and the values or expressions of the parameters may also be other values or expressions understandable by the communication apparatus. Each of the above tables may also be implemented with other data structures, for example, an array, queue, container, stack, linear table, pointer, chain table, tree, graph, structure, class, heap, hash table, or hash table may be used.

Predefined in the present disclosure may be understood as defined, pre-definition, stored, pre-stored, pre-negotiated, pre-configured, cured, or pre-fired.

Those of ordinary skill in the art will appreciate that the units and algorithm steps of each example described in conjunction with the embodiments disclosed herein can be implemented with electronic hardware, or a combination of computer software and electronic hardware. Whether these functions are performed in hardware or software depends on the specific application and design constraints of the technical solution. Skilled people can use different methods to implement the described functions for each specific application, but such implementation should not be considered beyond the scope of the present disclosure.

It can be further understood that although the operations are described in a specific order in the accompanying drawings in the embodiments of the present disclosure, it should not be understood as requiring that these operations be performed in the specific order or serial order shown, or that all the operations shown should be performed to obtain the desired results. In certain circumstances, multitasking and parallel processing may be beneficial.

Other embodiments of the present disclosure will easily occur to those skilled in the art after considering the specification and practicing the present disclosure disclosed herein. The present disclosure is intended to cover any variations, uses or adaptations of the present disclosure, and these variations, uses or adaptations follow general principles of the present disclosure and include common sense or common technical means in the technical field that are not disclosed in the present disclosure. The specification and embodiments are to be regarded as examples only, and true scope and spirit of the present disclosure are indicated by the following claims.

It is clearly understood by those skilled in the field to which it belongs that, for the convenience and brevity of the description, the specific working processes of the described systems, apparatuses, and units can be referred to the corresponding processes in the foregoing embodiments of the method, and will not be repeated herein.

The foregoing are only specific embodiments of the present disclosure, but the scope of protection of the present disclosure is not limited thereto, and any person skilled in the art who is familiar with the technical field of the present disclosure can readily think of changes or substitutions within the technical scope of the present disclosure that should be covered within the scope of protection of the present disclosure. Therefore, the scope of protection of the present disclosure is based on the scope of protection of the claims.

The invention claimed is:

1. A method of precoding a reconfigurable intelligent surface (RIS), performed by a terminal device, comprising:
   determining a precoding matrix indicator (PMI) and an additional deflection phase angle for each RIS unit group in an RIS array according to channel information of the each RIS unit group; and
   sending first indication information, wherein the first indication information indicates the precoding matrix indicator and the additional deflection phase angle for the each RIS unit group.

2. The method according to claim 1, further comprising:
   receiving second indication information, wherein the second indication information indicates RIS unit groups comprised in the RIS array.

3. The method according to claim 1, further comprising:
   receiving third indication information, wherein the third indication information indicates a number of rows and a number of columns of RIS units comprised in the RIS array; and
   performing grouping operation on the RIS array according to a preset rule and the number of rows and the number of columns of the RIS units comprised in the RIS array.

4. The method according to claim 3, wherein the preset rule comprises any one of:
   grouping the RIS units in every continuous M rows and continuous N columns into one group;
   grouping the RIS units in every continuous L rows and spaced S columns into one group;
   grouping the RIS units in every spaced P rows and continuous Q columns into one group; or
   grouping the RIS units in every spaced F rows and spaced R columns into one group, and
   wherein M, N, L, S, P, Q, F, and R are each positive integers, respectively.

5. A method of precoding a reconfigurable intelligent surface (RIS), performed by a network device, comprising:
   receiving first indication information, wherein the first indication information indicates a precoding matrix indicator (PMI) and an additional deflection phase angle for each RIS unit group in an RIS array, and
   wherein the PMI and the additional deflection phase angle for the each RIS unit group are determined by a terminal device according to channel information of the each RIS unit group in the RIS array.

6. The method according to claim 5, further comprising:
   sending second indication information, wherein the second indication information indicates RIS unit groups comprised in the RIS array.

7. The method according to claim 6, further comprising:
   determining a number of rows and a number of columns of RIS units comprised in the RIS array; and
   performing grouping operation on the RIS array according to a preset rule and the number of rows and the number of columns of RIS units comprised in the RIS array,
   wherein the preset rule comprises any one of:
      grouping the RIS units in every continuous M rows and continuous N columns into one group,
      grouping the RIS units in every continuous L rows and spaced S columns into one group, grouping the RIS units in every spaced P rows and continuous Q columns into one group, or grouping the RIS units in every spaced F rows and spaced R columns into one group, and wherein M, N, L, S, P, Q, F, and R are each positive integers, respectively.

8. The method according to claim 5, further comprising:
for the each RIS unit group, determining a continuous deflection phase angle for each RIS unit in the RIS unit group according to the PMI for the RIS unit group; and
for the each RIS unit, performing quantification on the continuous deflection phase angle and the additional deflection phase angle for the RIS unit respectively based on discrete deflection phase angles supported by the RIS array, and determining a final offset phase for the RIS unit.

9. The method according to claim 8, wherein, for the each RIS unit group, determining the continuous deflection phase angle for each RIS unit in the RIS unit group according to the PMI for the RIS unit group comprises:
determining a horizontal-dimensional beamforming vector and a vertical-dimensional beamforming vector for the RIS unit group according to the PMI for the RIS unit group; and
determining the continuous deflection phase angle for each RIS unit in the RIS unit group according to the horizontal-dimensional beamforming vector and the vertical-dimensional beamforming vector for the RIS unit group.

10. The method according to claim 8, wherein, for the each RIS unit, determining the final offset phase for the RIS unit comprises:
determining a discrete deflection phase angle with a smallest absolute value of a difference from the continuous deflection phase angle for the RIS unit as a discrete deflection phase angle for the RIS unit;
determining a discrete deflection phase angle with a smallest absolute value of a difference from the additional deflection phase angle for the RIS unit as a quantized additional deflection phase angle for the RIS unit; and
determining a sum of the discrete deflection phase angle and the quantized additional deflection phase angle for the RIS unit as the final offset phase for the RIS unit.

11. The method according to claim 8, further comprising:
sending third indication information, wherein the third indication information indicates a number of rows and a number of columns of RIS units comprised in the RIS array.

12. The method according to claim 8, further comprising:
sending the final offset phase for the each RIS unit to the RIS array; or
sending the final offset phase for the each RIS unit to the terminal device.

13. A method of precoding a reconfigurable intelligent surface (RIS), performed by an RIS array, comprising:
receiving first indication information, wherein the first indication information indicates a precoding matrix indicator (PMI) and an additional deflection phase angle for each RIS unit group in the RIS array, and
wherein the PMI and the additional deflection phase angle for the each RIS unit group are determined by a terminal device according to channel information of the each RIS unit group in the RIS array.

14. The method according to claim 13, further comprising:
for the each RIS unit group, determining a continuous deflection phase angle for each RIS unit in the RIS unit group according to the PMI for the RIS unit group; and
for the each RIS unit, performing quantification on the continuous deflection phase angle and the additional deflection phase angle for the RIS unit respectively based on discrete deflection phase angles supported by the RIS array, and determining a final offset phase for the RIS unit.

15. The method according to claim 14, wherein, for the each RIS unit group, determining the continuous deflection phase angle for each RIS unit in the RIS unit group according to the PMI for the RIS unit group comprises:
determining a horizontal-dimensional beamforming vector and a vertical-dimensional beamforming vector for the RIS unit group according to the PMI for the RIS unit group; and
determining the continuous deflection phase angle for each RIS unit in the RIS unit group according to the horizontal-dimensional beamforming vector and the vertical-dimensional beamforming vector for the RIS unit group.

16. The method according to claim 14, wherein, for the each RIS unit, determining the final offset phase for the RIS unit comprises:
determining a discrete deflection phase angle with a smallest absolute value of a difference from the continuous deflection phase angle for the RIS unit as a discrete deflection phase angle for the RIS unit;
determining a discrete deflection phase angle with a smallest absolute value of a difference from the additional deflection phase angle for the RIS unit as a quantized additional deflection phase angle for the RIS unit; and
determining a sum of the discrete deflection phase angle and the quantized additional deflection phase angle for the RIS unit as the final offset phase for the RIS unit.

17. The method according to claim 13, further comprising:
receiving a final offset phase for each RIS unit;
wherein receiving the final offset phase for each RIS unit comprises:
receiving the final offset phase for each RIS unit sent by the terminal device; or
receiving the final offset phase for each RIS unit sent by a network device.

18. A communication apparatus, comprising a processor and a memory, wherein a computer program is stored in the memory, and the processor executes the computer program stored in the memory to cause the apparatus to perform the method according to claim 1.

19. A communication apparatus, comprising a processor and a memory, wherein a computer program is stored in the memory, and the processor executes the computer program stored in the memory to cause the apparatus to perform the method according to claim 5.

20. A communication apparatus, comprising a processor and a memory, wherein a computer program is stored in the memory, and the processor executes the computer program stored in the memory to cause the apparatus to perform the method according to claim 13.

* * * * *